(12) United States Patent
Jeon et al.

(10) Patent No.: US 8,405,724 B2
(45) Date of Patent: Mar. 26, 2013

(54) AUTOMOBILE CAMERA MODULE AND METHOD TO INDICATE MOVING GUIDE LINE

(75) Inventors: Hae Jin Jeon, Suwon-si (KR); Moon Do Yi, Goyang-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 819 days.

(21) Appl. No.: 12/461,166

(22) Filed: Aug. 3, 2009

(65) Prior Publication Data

US 2010/0302368 A1    Dec. 2, 2010

(30) Foreign Application Priority Data

Jun. 2, 2009  (KR) ................ 10-2009-0048589

(51) Int. Cl.
*H04N 7/18*  (2006.01)
(52) U.S. Cl. ........................ 348/148; 382/104
(58) Field of Classification Search .......... 348/148; 340/932
See application file for complete search history.

(56) References Cited

U.S. PATENT DOCUMENTS

| 6,999,002 | B2* | 2/2006 | Mizusawa et al. | 340/932.2 |
|---|---|---|---|---|
| 2005/0143895 | A1* | 6/2005 | Kato | 701/96 |
| 2006/0072011 | A1* | 4/2006 | Okada | 348/148 |
| 2008/0122654 | A1* | 5/2008 | Sakakibara | 340/932.2 |
| 2008/0266389 | A1* | 10/2008 | DeWind et al. | 348/115 |
| 2010/0079582 | A1* | 4/2010 | Dunsmore et al. | 348/46 |

FOREIGN PATENT DOCUMENTS

| JP | 2000-78566 | 3/2000 |
|---|---|---|
| JP | 2000-313292 | 11/2000 |
| JP | 2004-262449 | 9/2004 |
| KR | 20-0345814 | 3/2004 |
| KR | 10-2004-0031576 | 4/2004 |
| KR | 10-2007-0116199 | 12/2007 |

OTHER PUBLICATIONS

Korean Office Action mailed Sep. 17, 2010 issued in corresponding Korean Patent Application No. 10-2009-0048589.
Korean Notice of Allowance mailed Feb. 23, 2011 issued in corresponding Korean Patent Application No. 10-2009-0048589.

* cited by examiner

*Primary Examiner* — Sath V Perungavoor
*Assistant Examiner* — Kate Luo

(57) ABSTRACT

The present invention relates to a camera module and a method to indicate a moving guide line using the same. The camera module includes a memory for storing guide line images for vehicle traveling traces divided according to a steering angle of the vehicle's handle; an image sensor for photographing a front image or a rear image, and generating an image signal for an image obtained by overlapping the guide line image stored in the memory with the photographed image; a controller (CAN MCU) for receiving steering angle information of the vehicle's handle, extracting a guide line image corresponding to the steering angle from the guide line images, and controlling the image sensor to perform image overlapping; and an image output amp for converting a signal of the image overlapped in the image sensor into an output signal, and transmitting the converted signal to an image display unit through a serial bus network.

14 Claims, 3 Drawing Sheets

| GUIDE LINE (MEMORY) | | STEERING ANGLE |
|---|---|---|
|  | $Im_{La}$ | $\theta_{LMax} \sim \theta_{L(Max-a)}$ |
|  | $Im_{L(a-1)}$ | $\theta_{L(Max-a+1)} \sim \theta_{L(Max-2a)}$ |
|  | ... | $\theta_{L(Max-2a+1)} \sim \theta_{L(Max-3a)}$ |
|  | $Im_{L2}$ | ... |
|  | $Im_{L1}$ | $\theta_{L(Max-(a-1))} \sim \theta_{L(Max-an)}$ |
|  | 0 | 0 |
|  | $Im_{R1}$ | $\theta_{R(1)} \sim \theta_{R(a)}$ |
|  | $Im_{R2}$ | $\theta_{R(a+1)} \sim \theta_{R(a2)}$ |
|  | ... | $\theta_{R(a2+1)} \sim \theta_{R(a3)}$ |
|  | ... | ... |
|  | $Im_{R(a-1)}$ | ... |
|  | $Im_{Ra}$ | $\theta_{R(a(a-1)+1)} \sim \theta_{R(an)}$ |

AUTOMOBILE CAMERA MODULE AND METHOD TO INDICATE MOVING GUIDE LINE

CROSS-REFERENCE TO RELATED APPLICATIONS

This application claims the benefit of Korean Patent Application No. 10-2009-0048589 filed with the Korea Intellectual Property Office on Jun. 2, 2009, the disclosure of which is incorporated herein by reference.

BACKGROUND OF THE INVENTION

1. Field of the Invention

The present invention relates to a camera module mounted on an vehicle, and a method to indicate a moving guide line using the same; and, more particularly, to an automobile camera module and a method to indicate a moving guide line using the same, which can display a rear photography image and a guile line image stored divided according to a steering angle of a vehicle's handle in an overlay scheme when the vehicle moves in reverse, and thus provide a guide line for the actual rear situation, so that the vehicle's driver can easily back-in park.

2. Description of the Related Art

A vehicle has been recently developed to provide traveling performance safety and various conveniences. A number of sensors are provided inside or outside of the chassis so that it is possible to sense the external surrounding environment even in the vehicle.

As one of the safety and convenience systems, parking assistant systems have been provided to prevent an accidental collision that may occur during traveling, in which a camera is mounted on the front or the rear of the vehicle to display an external image on a monitor when the vehicle enters a side street, or moves in reverse for parking.

In particular, side mirrors and room mirrors mounted inside or outside of the vehicle are mostly used at the time of back-in parking. However, blind spots exist despite the fact that the vehicle is equipped with the side and room mirrors, so that the vehicle's driver cannot recognize an obstacle that is located a short distance away the rear of the vehicle.

In order to solve this problem, a technology has been developed to help a driver back-in park conveniently or backward-move easily through an image displayed on the monitor as an assistant means. Herein, the image is photographed by the camera mounted on the rear of the vehicle.

However, only with a simple image provided from the camera that photographs the rear of the vehicle, it is difficult to estimate a vehicle trace, and to obtain information regarding distance from a rear obstacle. Further, there is caused optical illusion phenomenon in which the photographed rear obstacle is visually perceived to be at a location that is farther than a location where the rear obstacle is actually located.

In order to solve such a problem, a luxury vehicle is provided with a function for displaying an image photographed by a camera together with a vehicle traveling trace, thereby allowing the driver to estimate a direction in which the vehicle moves, which helps an inexperienced driver or an aged driver back-in park easily.

However, a scheme for providing a rear image together with the vehicle traveling trace has a problem in that because the trace is displayed by different angles of view changed depending on a location where the camera is mounted, the vehicle traveling trace displayed on the photographed image should be newly set through a CPU every time angles of view are changed.

Further, since an estimated traveling trace with which the image photographed by the camera mounted on the vehicle is additionally provided is mostly displayed to have a linear shape that gets narrow toward the rear side, it is difficult to display a traveling trace of the actual vehicle that backward-moves at various angles.

Furthermore, in order to additionally provide a rear traveling trace to the image photographed by the camera mounted on the vehicle, the vehicle is required to be equipped with a separate trace generation device, and a separate CPU. Herein, the separate trace generation device generates a traveling trace including calculated traveling ranges, and the separate CPU is used to overlap the generated traveling trace with an image photographed by the camera and output the overlapped image. Therefore, there are problems such as complex device configuration, and increase in manufacturing costs.

SUMMARY OF THE INVENTION

The present invention has been invented in order to overcome the above-described problems and it is, therefore, an object of the present invention to provide an automobile camera module and a method to indicate a moving guide line, in which an image sensor itself overlaps an image photographed by a camera with a guide line image divided and stored for each steering angle of a vehicle's handle in a memory, and displays a rear image and a guide line image changed according to the steering angle of the handle in an overlay scheme on a monitor mounted inside of the vehicle, thereby easily recognizing rear situation of the vehicle.

Further, another object of the present invention is to provide an automobile camera module and a method to indicate a moving guide line using the same, which pre-stores guide line images that may be changed depending on an image, photographed according to angles of view of a camera mounted on the vehicle, displays the stored guide line image and the photographed image in an overlay scheme, thereby providing a rear traveling trace of the vehicle only through overlapping of the preset guide line image with the photographed image without a separate image generation device.

In accordance with one aspect of the present invention to achieve the object, there is provided an automobile camera module including: a memory for storing guide line images for vehicle traveling traces divided according to a steering angle of the vehicle's handle; an image sensor for photographing a front image or a rear image, and generating an image signal for an image obtained by overlapping the guide line image stored in the memory with the photographed image; a controller (CAN MCU) for receiving steering angle information of the vehicle's handle, extracting a guide line image corresponding to the steering angle from the guide line images, and controlling the image sensor to perform image overlap; and an image output amp for converting a signal of the image overlapped in the image sensor into an output signal, and transmitting the converted signal to an image display unit through a serial bus network.

Further, the automobile camera module may further include a communication unit for transmitting and receiving a steering signal of the vehicle to/from the controller by recognizing the steering angle of the handle attached to the vehicle.

The communication unit may be connected in a communication scheme of a Controller Area Network (CAN) or an RS232.

The memory (EEPROM) may be composed of a flash memory, and stores guide line images having the vehicle's traveling trace displayed thereon. In this case, the guide line images are divided and stored for each of right and left steering angles of the vehicle's handle in the memory. The guide line images have the maximum 200 guide line images according to the steering angle of the handle stored therein in the form of bitmap.

Further, a number of the guide line images stored in the memory are selected by steering angle information of the handle that the controller receives, and a selected guide line image is overlaid and outputted with the image photographed in the image sensor.

The image sensor photographs an external image of the front or the rear of the vehicle through a lens unit mounted on the camera module, converts the photographed image into an image signal, and then outputs the converted signal to the image display unit through the image output amp.

In this case, the image sensor itself overlaps the photographed image with a guide line image selected according to a steering angle of the handle through the controller, and converts the overlapped image into an image signal through the image display unit.

Further, the controller receives steering angle information of the handle received through the communication unit, extracts a guide line image for a corresponding steering angle, so that the controller can control the image sensor to perform overlap and recognize the front rotation angle with respect to the central axis of the vehicle.

That is, the controller recognizes a current front rotation angle of the vehicle, thereby setting the front rotation angle as a reference axis, and then receives steering angles of right-rotated handle and left-rotated handle based on the current reference axis through the communication unit.

The image output amp is electrically connected to the image sensor and the image display unit, and converts an image signal converted by the image sensor into an external output signal of Nation Television System Committee (NTSC) or Phase Alternating Line (PAL) scheme to transmit the converted image signal to the image display unit.

In accordance with another aspect of the present invention to achieve the object, there is provided a method to indicate a moving guide line including the steps of: photographing an external image of a vehicle through a camera module mounted on the front or the rear of the vehicle; receiving, by a controller, a steering signal for a steering angle of the vehicle's handle through a communication unit connected to the camera module; selecting a guide line image corresponding to the steering signal from a plurality of guide line images, stored in a memory within the camera module, based on steering angle information of the vehicle's handle received to the controller; transmitting the guide line image selected by the controller to an image sensor within the camera module, and then overlapping the transmitted guide line image with the external image photographed by the image sensor; and converting the image, obtained by overlapping the external image with the guide line image, into an image signal, and then outputting the image signal to the image display unit connected to the camera module, through an image output amp connected to the image sensor.

In the step of receiving the steering angle, the controller receives a current front rotation angle of the vehicle through the communication unit, and sets the front rotation angle as a reference axis, and then receives information about a steering angle of the vehicle's handle based on the set reference axis from the communication unit.

In the step of overlapping the guide line image with the external image, the image sensor overlaps a guide line image corresponding to the steering angle information of the vehicle's handle selected from the guild line images stored in the memory with an external image based on one-to-one correspondence in an image overlapping unit of the image sensor, and transmits the overlapped image to an outside through a video encoder.

In this case, the external image photographed by the camera module is subjected to brightness and color adjustment processes through an image processor before being overlapped with the guide line image, and the guide line image is subjected to an image correction process for correcting an image according to surrounding brightness through a lens compensating unit before being selected, so that the external image is finally overlapped with the selected guide line image.

Further, in the step of outputting an image signal to the image display unit, the image signal outputted through the image output amp is converted into an external output signal of an NTSC or a PAL scheme, thereby outputting an image through an external monitor.

Meanwhile, in the step of overlapping the guide line image with the external image, a corresponding guide line image can be selected according to the steering angle of the handle by matching a multiple of information to a specific value of the guide line image stored in the memory, wherein the information is calculated by dividing a sum of a greatest right steering angle and a greatest left steering angle by the number of the guide line images.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, embodiments of the present invention will be described in detail with reference to the accompanying drawings illustrating an automobile camera module and a method to indicate a moving guide line using the same. The following embodiments are provided as examples to allow those skilled in the art to sufficiently appreciate the spirit of the present invention.

Figure 1:
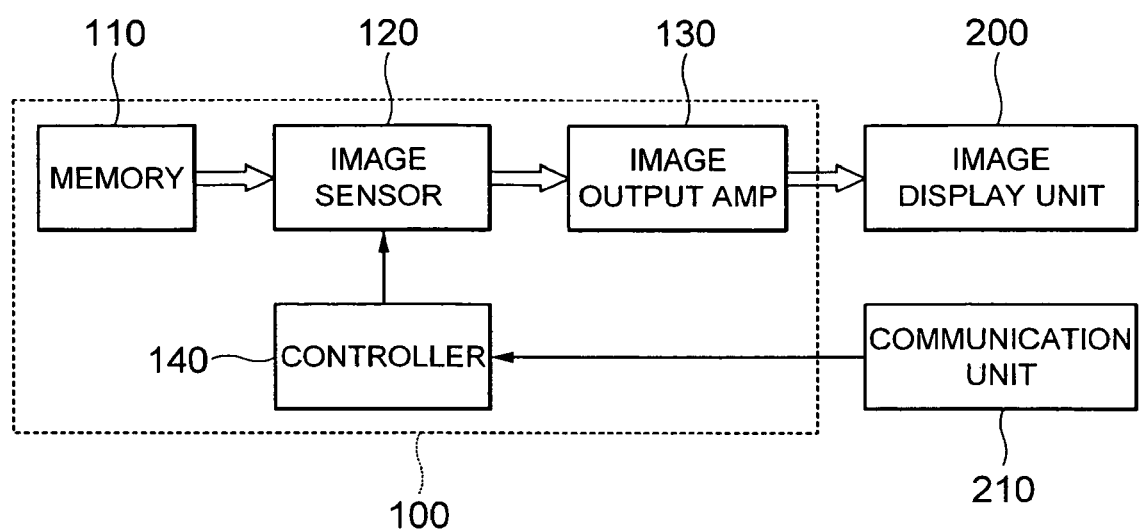
FIG. 1 is a block diagram illustrating an automobile camera module in accordance with the embodiment of the present invention.

First of all, FIG. 1 is a block diagram illustrating an automobile camera module in accordance with the embodiment of the present invention.

As shown in FIG. 1, the automobile camera module 100 may include a memory 110, an image sensor 120, and an image output amp 130. The memory 110 stores a plurality of guide lines based on a steering angle of a vehicle's handle, and the image sensor 120 photographs an external image and then overlaps the photographed image with the guide line image divided according to a steering angle stored in the memory 110. The image output amp 130 transmits an image having a guide line image overlapped therewith to the outside.

Also, the automobile camera module 100 selects a guide line image, which is to be overlapped by the image sensor 120, according to a steering angle of the handle, and it further includes a controller 140 for controlling the image sensor 120 to perform one-to-one overlap.

The memory 110, which is built in the automobile camera module 100, transmits information stored in the memory 110 to the image sensor 120. In this case, the memory 110 may include a flash memory, and stores guide line images having various shapes for rear traveling traces divided according to a steering angle of the vehicle's handle.

The guide line image may be stored by dividing the rear traveling trace of the vehicle for each of representative steering angles with reference to a rear image of the vehicle. The guide line image may have a total of 200 guide line images. The 200 guide line images may be stored in the form of bitmap. The total of 200 guide line images are divided into 100 guide line images for each of the right and left steering angles based on a location at which the vehicle's wheel is in an original position as 0°.

The image sensor 120 which can transmit and receive data to/from the memory 110 photographs a front image or mostly a rear image. The image sensor 120 overlaps the specific guide line image received from the memory 110 with the rear photography image by itself, and outputs the overlapped image.

In this case, the guide line image to be overlapped with the rear photography image by the image sensor 120 corresponds to a specific guide line image selected according to a steering angle of the vehicle. Herein, a detailed description will be given of a method for selecting a guide line image according to a steering angle of the handle.

The image sensor 120 converts a rear image, photographed through a lens unit (not shown) mounted in the automobile camera module 100, into an image signal, and transmits the converted image signal to an image display unit 200, which includes an external monitor, through the image output amp 130 electrically connected to the image sensor 120.

In this case, the image sensor 120 receives a guide line image, which is to be overlapped with the photographed rear image, from the memory 110, thereby performing image overlap by mixture of color information (RGB) for the images.

Hereinafter, a detailed description will be given of a method in which the image sensor 120 overlaps the photographed rear image with the guide line image.

Meanwhile, the guide line image to be transmitted to the image sensor 120 is selected according to a steering angle of the handle by the controller 140, and the guide line selected by the controller 140 is allowed to be overlapped with the rear image in the image sensor 120.

The controller 140 may include a CAN MCU, and the controller 140 and the image sensor 120 are interconnected to transmit and receive data between them through I2C communication.

The controller 140 is connected to a communication unit 210 through the communication scheme of the automobile camera module 100, a CAN, and so on, and thus receives a control signal which the controller 140 needs, i.e. information for steering angles of the vehicle's handle.

In this case, the communication unit 210 may use a communication scheme of CAN 2.0 or an RS232 protocol, and mostly use the CAN communication scheme capable of continuous data transmission and reception because it is required to transmit and receive data for image processing.

The CAN communication refers to a communication scheme, in which when a plurality of sensors or motors are required to be incorporated in a system including a vehicle, communication information of peripheral devices is transferred to all nodes within the network by using a unique identifier of each of the peripheral devices, and then respective nodes determine whether or not to process corresponding information based on the identifier, thereby allowing data to be seamlessly transmitted and received.

The information of the steering angle of the handle received in the communication unit 210 is received to the controller 140 provided in the automobile camera module 100 though the CAN, and the controller 140 extracts the guide line image for a corresponding steering angle from the memory 110.

When the information of the guide line image extracted from the memory 110 is received in the image sensor 120, the controller 140 controls the image information photographed by the image sensor 120 to be overlapped with the guide line image on the basis of one-to-one correspondence.

In this case, the controller 140 recognizes the steering angle information of the handle, received through the communication unit 210, as well as a front rotation angle with respect to a central axis of the vehicle, thereby setting the front rotation angle as a reference axis.

That is, the controller 140 allows a corresponding guide line image estimated according to right and left steering angles of the vehicle's handle to be extracted from the memory 110 by taking the front rotation angle as the reference axis based on the current vehicle's central axis, and allows the corresponding guide line image to be overlapped with the rear photography image, so that the overlapped image can be displayed.

Also, the image output amp 130 converts an image obtained by overlapping the rear photography image with the guide line image in the image sensor 120 (hereinafter, referred to as "guide line displayed image") into an external output signal, and then transmits the converted output signal to the external monitor.

In this case, the image output amp 130 converts the guide line displayed image into an external output signal of an NTSC (Nation Television System Committee) or a PAL (Phase Alternating Line) scheme to transmit the resultant signal to the external monitor.

The automobile camera module 100 having the above-described same construction is equipped with the image sensor 120 and the memory 110, so that the image sensor 120 itself overlaps the external image, photographed by the image sensor 120, with the guide line image which the memory 110 stores for each steering angle of the handle, so as to display the guide line displayed image on the external monitor.

Figure 2:
FIG. 2 is a view showing that the steering angles are respectively matched to guide line images stored in the memory of the camera module in accordance with the embodiment of the present invention.
Figure 2:
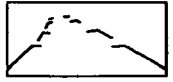
Figure 2:
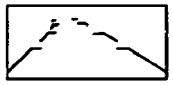
Figure 2:
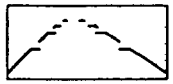
Figure 2:
Figure 2:
Figure 2:
Figure 2:
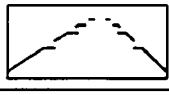
Figure 2:
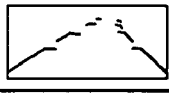
Figure 2:
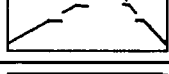
Figure 2:
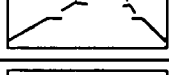
Figure 2:
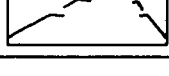

Meanwhile, FIG. 2 is a view showing that the steering angles are respectively matched to guide line images stored in the memory of the camera module in accordance with the embodiment of the present invention.

FIG. 2 shows guide line images of the memory 110, which may be selected according to an actual steering angles when the guide line image is overlapped with an image photographed by the camera module.

As described above, the memory 110 stores about 200 guide line images divided for each of right and left steering angles on the basis of handle's steering angle 0°.

The controller 140 within the automobile camera module 100 receives information about handle's steering angle based on the reference axis of a current vehicle through the communication unit 210. Then, a corresponding guide line image is selected for handle's steering angle through the information about the steering angle received to the controller 140.

In this case, the controller 140 transmits information of the guide line image selected for the handle's steering angle to the image sensor 120 through I2C communication. Then, the image sensor 120 selects and calls the guide line image for a corresponding steering angle from the memory 110 by a steering signal.

The memory 110 transmits information about the guide line image called in the image sensor 120, through an SPI communication, and the image sensor 120 overlaps the photographed image with the called guide line image by combination of pixel information for the images.

As such, a detailed description will be given of an example of a process for selecting guide line image which is to be overlapped with the photographed image by the image sensor 120.

It is assumed that a greatest left angle is defined as $\theta_{LMax}$, and a greatest right angle is defined as $\theta_{RMax}$ in handle's steering angles inputted through the communication unit 210. If the number of guide line images stored in the memory is 2n+1, handle's steering angels of the vehicle may be divided into $\theta_{LMax}=\{\theta_{L1}, \theta_{L2}, \ldots, \theta_{LMax-1}, \theta_{LMax}\}$, and $\theta_{RMax}=\{\theta_{R1}, \theta_{R2}, \ldots \theta_{RMax-1}, \theta_{RMax}\}$. Further, the number of left guide line images stored in the memory 110 may be expressed as $\text{Im}_{LN}=\{\text{IM}_{L(n)}, \text{Im}_{L(n)}1, \text{Im}_{L(n-2)}, \ldots \text{Im}_{L1}, 0\}$, and the number of right guide line images stored in the memory 110 may be expressed as $\text{Im}_{RN}=\{0, \text{IM}_{R(1)}, \text{Im}_{r(2)}, \ldots \text{Im}_{R(n-1)}, \text{Im}_{R(n)}\}$.

A guide line image corresponding to an actual steering angle can be selected from the guide line images for each of right and left steering angles stored in the memory 110, by multiplying each steering angle to a result value (a) defined as equation (1) below.

$$a = \frac{(\theta_{RMax} + \theta_{LMax})}{2N+1} \quad (1)$$

Therefore, the guide line image that may be selected by equation (1) is selected as shown in FIG. 2.

Figure 3:
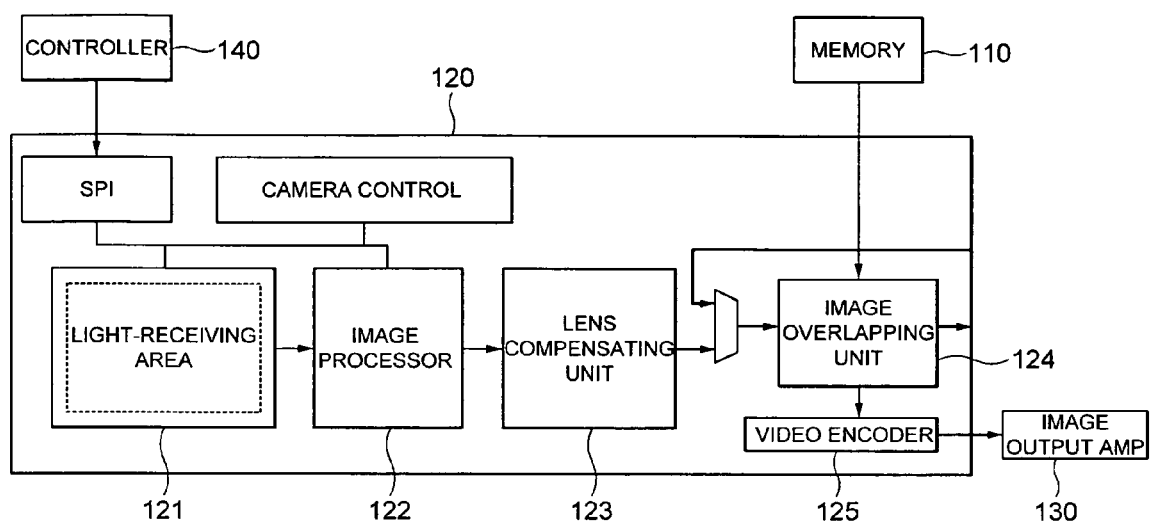
FIG. 3 is a block diagram of an image sensor applied to a camera module in accordance with an embodiment of the present invention.

FIG. 3 is a block diagram of an image sensor applied to a camera module in accordance with an embodiment of the present invention.

A detailed description will be given of a process in which the image sensor 120 overlaps the rear photography image with the guide line image extracted from the memory 110 with reference to FIG. 3.

As shown in FIG. 3, the image sensor 120 includes a light-receiving area 121 for receiving external image information, an image processor 122 for adjusting brightness and colors of images, a lens compensating unit 123 for compensating for brightness around the lens, and an image overlapping unit 124 for performing overlap of the guide line images based on the pixel information of the light-receiving area 121.

The light-receiving area 121 may have a VGA 640×480 resolution in consideration of the size and resolution of an external monitor. Brightness and colors for the external image stored in the light-receiving area 121 may be adjusted through the image processor 122.

In order to photograph an image through the light-receiving area 121, a lens unit (not shown) onto which external light is incident allows the image to be photographed clearly by compensating the brightness of the light incident through the lens unit by means of a lens compensating unit 123.

Meanwhile, after correction for the photographed image through the light-receiving area 121 and compensation of the leans are completely performed, a corresponding guide line image according to a steering angle is extracted from the memory 110 by recognition of steering angle information of the controller 140. Then, the image overlapping unit 124 overlaps the external image photographed by the light-receiving area 121 with the corresponding guide line image so that pixel information of the external image is matched to that of the guide line image, respectively on the basis of one-to-one correspondence.

Thereafter, the guide line displayed image is transmitted to the image output amp 130 through the video encoder 125. Then, the image output amp 130 converts the transmitted image into an output signal to display the converted signal on the external monitor.

Hereinafter, a description will be briefly given of a process for overlapping images by the image overlapping unit 124. For example, RGB information of $i^{th}$ pixel in image information of 640×480 pixels generated through the light-receiving area 121 is overlapped with color information of $i^{th}$ guide line image stored in the memory 110.

That is, if it is assumed that R, G, B data of $i^{th}$ image information are defined as $R_i^{image}$, $G_i^{image}$, $B_i^{image}$, respectively, and R, G, B data of color information of $i^{th}$ guide line image are defined as $R_i^{line}$, $G_i^{line}$, $B_i^{line}$, respectively, the guide line image is overlapped with the photographed image by combination of color information through equation (2) below.

$$R_i = (1-t)R_i^{image} + tR_i^{line}$$

$$G_i = (1-t)G_i^{image} + tG_i^{line}$$

$$B_i = (1-t)B_i^{image} + tB_i^{line} \quad (2)$$

In equation (2), 't' ranges between 0 and 1, 't' determines transparency of the guide line images. Further, colors of the guide line images become deep as 't' is increased, whereas colors of the guide line image become light as 't' is decreased. That is, the guide line fails to be displayed on the image when 't' has a value of 0.

Meanwhile, a moving guide line according to a rear traveling trace can be displayed by information received through the camera module having the above-described construction, and thus an external image of the vehicle is photographed by the automobile camera module 100 mounted on the front or mostly rear of the vehicle. Then, the image photographed by the camera module is subjected to brightness and color adjustment processes, and is converted into an image signal by the image sensor.

The automobile camera module 100 receives steering angle information of vehicle's handle through the communication unit 210, which includes a CAN, and so on. The steering angle information of vehicle's handle is received to the controller 140 within the automobile camera module 100 through the communication unit 210. By the steering angle information received to the controller 140, a guide line image corresponding to the received steering angle is selected from among the guide line images stored in the memory 110.

Then, the image overlapping unit 124 of the image sensor 120 transmits the guide line image selected by the controller 140 to the image sensor 120 within the camera module, and then overlaps the transmitted image with the external image based on combination of color information of R, G, and B.

Thereafter, the image output amp converts the image overlapped by the image overlapping unit 124 into an output signal capable of outputting an image, and then transmits the converted image to the external device, so that the guide line displayed image can be displayed on the external monitor.

In the procedure of outputting the guide line displayed image, the controller 140 is composed of a CAN MCU connected to perform communication through a CAN, and the controller 140 receives a current front rotation angle of the vehicle through the communication unit 210, and then sets the received current front rotation angle as a reference axis. Then, the controller 140 receives information about a steering angle of vehicle's handle based on the reference axis through the communication unit 210.

That is, a point at which central axis of the vehicle is currently located is set as a reference axis, and a steering angle of the vehicle's handle is received so as to provide a rear photography image with a moving guide line in an overlay scheme.

Further, the image overlapping unit 124 of the image sensor 120 overlaps an external image with a guide line image corresponding to the steering angle of vehicle's handle among the guide line images stored in the memory 110 based on one-to-one correspondence of their pixel information, and then transmits the overlapped image to an outside through the video encoder 125 and the image output amp 130.

As described above, according to an automobile camera module and a method to indicate a moving guild line using the same, a guide line image for each of steering angles of the vehicle's handle is overlapped with an image photographed by a camera in the image sensor itself, and then overlapped image is outputted to an external monitor, so that a system can be simply constructed only with a camera module so as to perform image overlap and image output, which results in reduction of manufacturing costs. Further, an area occupied by the camera module can be minimized, which results in easy mounting and reduction in mounting costs.

Furthermore, the automobile camera module and the method to indicate a moving guide line in accordance with the present invention have advantages in that an angle of view of the camera module can be simply adjusted according to the mounting location. In addition, it is possible to indicate a rear moving guide line of vehicle only through connection of the camera module to the communication unit.

As described above, although the preferable embodiments of the present invention have been shown and described, it will be appreciated by those skilled in the art that substitutions, modifications and changes may be made in this embodiment without departing from the principles and spirit of the general inventive concept, the scope of which is defined in the appended claims and their equivalents.

What is claimed is:

1. An automobile camera module comprising:
a memory to store guide line images for vehicle traveling traces divided according to a steering angle of the vehicle's handle;
an image sensor to photograph a front image or a rear image, and to generate an image signal for an image obtained by overlapping the guide line image stored in the memory with the photographed image;
a controller (CAN MCU) to receive steering angle information of the vehicle's handle, to extract a guide line image corresponding to the steering angle from the guide line images, and to control the image sensor to perform image overlap; and
an image output amp to convert a signal of the image overlapped in the image sensor into an output signal, and transmit the converted signal to an image display unit,
wherein, when receiving steering angle information of the handle through a communication unit, the controller sets a front rotation angle as a reference axis by recognizing the front rotation angle based on the central axis of the vehicle, and receives steering angle information of left-rotated handle or right-rotated handle based on the reference axis through the communication unit.

2. The automobile camera module of claim 1, further comprising a communication unit to transmit and receive a steering signal of the vehicle to/from the controller by recognizing the steering angle of the handle attached to the vehicle.

3. The automobile camera module of claim 2, wherein the communication unit is connected in a communication scheme of a Controller Area Network (CAN) or an RS232.

4. The automobile camera module of claim 1, wherein the memory may be composed of a flash memory, and stores guide line images divided for each of right and left steering angles of the vehicle's handle, and has the maximum 200 guide line images according to the steering angle of the handle stored therein in the form of bitmap.

5. The automobile camera module of claim 4, wherein the guide line images are selected by the steering angle information of the handle that the controller receives through the communication unit, and the selected guide line image is overlapped with an image photographed by the image sensor.

6. The automobile camera module of claim 1, wherein the image sensor comprises:
a light-receiving area to receive external image information, an image processor to adjust brightness and colors of an image, a lens compensating unit to compensate brightness around the lens, and an image overlapping unit to overlap pixel information of the guide line images with pixel information of the light-receiving area based on one-to-one correspondence.

7. The automobile camera module of claim 5, wherein a guide line image corresponding to an actual steering angle range is selected from among the guide line images for each of right and left steering angles stored in the memory, by multiplying each steering angle to a value (a), as expressed by a following equation, calculated by dividing a sum of a greatest right steering angle and a greatest left steering angle by the number of the guide line images:

$$a = \frac{(\theta_{RMax} + \theta_{LMax})}{2N+1}.$$

8. The automobile camera module of claim 1, wherein the image output amp is electrically connected to the image sensor and the image display unit, and converts an image signal converted by the image sensor into an external output signal of Nation Television System Committee (NTSC) or Phase Alternating Line (PAL) scheme to transmit the converted image signal to the image display unit.

9. A method to indicate a moving guide line comprising:
photographing an external image of a vehicle through a camera module mounted on the front or the rear of the vehicle;
receiving, by a controller, a steering signal for a steering angle of the vehicle's handle through a communication unit connected to the camera module, the controller receiving a current front rotation angle of the vehicle through the communication unit, and setting the front rotation angle as a reference axis, and then receiving information about a steering angle of the vehicle's handle based on the set reference axis from the communication unit;

selecting a guide line image corresponding to the steering signal from a plurality of guide line images, stored in a memory within the camera module, based on steering angle information of the vehicle's handle received to the controller;

transmitting the guide line image selected by the controller to an image sensor within the camera module, and then overlapping the transmitted guide line image with the external image photographed by the image sensor; and converting the image, obtained by overlapping the external image with the guide line image, into an image signal, and then outputting the image signal to the image display unit connected to the camera module, through an image output amp connected to the image sensor.

10. The method of claim 9, wherein, in the transmitting, the image sensor overlaps a guide line image corresponding to the steering angle information of the vehicle's handle selected from the guild line images stored in the memory with an external image based on one-to-one correspondence in an image overlapping unit of the image sensor, and transmits the overlapped image to an outside through a video encoder.

11. The method of claim 10, wherein, in the transmitting, the external image photographed by the camera module is subjected to brightness and color adjustment processes through an image processor before being overlapped with the guild line image, and the guide line image is subjected to an image correction process for correcting an image according to surrounding brightness through a lens compensating unit before being selected, so that the external image is finally overlapped with the selected guide line image.

12. The method of claim 9, wherein, in the converting, the image signal outputted through the image output amp is converted into an external output signal of an NTSC or a PAL scheme, thereby outputting an image through the image display unit.

13. The automobile camera module of claim 1, wherein a guide line image corresponding to an actual steering angle range is selected from among the guide line images for each of right and left steering angles stored in the memory, by multiplying each steering angle to a value (a), as expressed by a following equation, calculated by dividing a sum of a greatest right steering angle and a greatest left steering angle by the number of the guide line images:

$$a = \frac{(\theta_{RMax} + \theta_{LMax})}{2N+1}.$$

14. The camera module of claim 1, wherein the overlapping is performed without rotational conversion of the guide line image or the photographed image.

* * * * *

UNITED STATES PATENT AND TRADEMARK OFFICE
CERTIFICATE OF CORRECTION

PATENT NO. : 8,405,724 B2   Page 1 of 1
APPLICATION NO. : 12/461166
DATED : March 26, 2013
INVENTOR(S) : Jin Hae Jeon et al.

It is certified that error appears in the above-identified patent and that said Letters Patent is hereby corrected as shown below:

In the Claims:

Column 11, Line 18, In Claim 10, delete "guild" and insert -- guide --, therefor.
Column 11, Line 26, In Claim 11, delete "guild" and insert -- guide --, therefor.
Column 12, Line 23 (Approx.), In Claim 14, delete "camera" and insert -- automobile camera --, therefor.

Signed and Sealed this
Sixteenth Day of July, 2013

Teresa Stanek Rea
*Acting Director of the United States Patent and Trademark Office*